(12) United States Patent
Pollard

(10) Patent No.: US 10,244,866 B2
(45) Date of Patent: Apr. 2, 2019

(54) MODULAR STORAGE RACK

(71) Applicant: Brian Andrew Pollard, Toronto (CA)

(72) Inventor: Brian Andrew Pollard, Toronto (CA)

(*) Notice: Subject to any disclaimer, the term of this patent is extended or adjusted under 35 U.S.C. 154(b) by 126 days.

(21) Appl. No.: 15/648,768

(22) Filed: Jul. 13, 2017

(65) Prior Publication Data

US 2018/0014641 A1    Jan. 18, 2018

(30) Foreign Application Priority Data

Jul. 14, 2016    (CA) ..................... 2936122

(51) Int. Cl.
```
A47B 73/00      (2006.01)
A47B 47/00      (2006.01)
F16B 5/00       (2006.01)
```
(52) U.S. Cl.
CPC ........ *A47B 73/006* (2013.01); *A47B 47/0066* (2013.01); *A47B 73/00* (2013.01); *F16B 5/00* (2013.01)

(58) Field of Classification Search
CPC ... A47B 73/006; A47B 47/0066; A47B 73/00; A47B 47/0075; F16B 5/00; F16B 5/0004; F16B 5/002; F16B 5/0032
See application file for complete search history.

(56) References Cited

U.S. PATENT DOCUMENTS

| 1,525,970 A | 2/1925 | Wildberg |
| D236,411 S | 8/1975 | Horney |
| 4,023,681 A | 5/1977 | Plant |
| D252,550 S | 8/1979 | Johnson |
| 4,270,662 A | 6/1981 | Gonzalez |

(Continued)

FOREIGN PATENT DOCUMENTS

| CA | 166923 | 9/2016 |
| CN | 201530355453 | 9/2015 |

(Continued)

OTHER PUBLICATIONS

Infinity Bottle Rack—Blue. Online, published date Jun. 14, 2014. Retrieved on Nov. 22, 2017 from URL: https://www.amara.com/products/infinity-bottle-rack-blue.

(Continued)

*Primary Examiner* — Ko H Chan
(74) *Attorney, Agent, or Firm* — Hamre, Schumann, Mueller & Larson, P.C.

(57) ABSTRACT

There is provided a modular storage rack comprising flat panels each comprising one or more flat segments and cross panels each comprising one or more cross segments. Each flat segment comprises a slit extending partway through it. Each cross segment comprises: a first and a second planar portion each terminating in a first and second lip respectively. The first lip faces the second lip, and they define a slot for receiving the flat segment. Each cross segment also comprises an island joining the first planar portion to the second planar portion, the island disposed in the slot and between the first and second lips. The island is configured to be received in the slit. Each flat segment is matingly connected to a corresponding cross segment such that the flat segment is received in the corresponding slot and the corresponding island is received in the corresponding slit.

15 Claims, 17 Drawing Sheets

(56) References Cited

U.S. PATENT DOCUMENTS

| | | | | |
|---|---|---|---|---|
| 4,422,555 | A * | 12/1983 | Jacobs | A47B 73/006 211/189 |
| D289,587 | S | 5/1987 | Levine | |
| D317,991 | S | 7/1991 | Wightman | |
| 5,197,612 | A * | 3/1993 | Thomson | A47B 73/004 211/74 |
| 6,615,996 | B1 * | 9/2003 | Ivey | A47B 73/006 206/175 |
| D488,964 | S | 4/2004 | Dagan | |
| D525,091 | S | 7/2006 | Baxter et al. | |
| D569,655 | S | 5/2008 | Williams | |
| D650,541 | S | 12/2011 | Mayer et al. | |
| D682,051 | S | 5/2013 | Lesbirel | |
| 8,662,326 | B2 * | 3/2014 | Brick | A47B 47/042 211/186 |
| D796,344 | S | 9/2017 | Paulick | |
| 2003/0205544 | A1 * | 11/2003 | Rhodes | A47B 47/0066 211/74 |
| 2006/0005497 | A1 * | 1/2006 | Foell | E04B 2/8629 52/589.1 |
| 2008/0308508 | A1 | 12/2008 | Fischer | |
| 2013/0008864 | A1 | 1/2013 | Davis et al. | |

FOREIGN PATENT DOCUMENTS

| | | | |
|---|---|---|---|
| FR | 2314982 | A * | 2/1977 |
| GB | 3009909 | | 1/2003 |

OTHER PUBLICATIONS

Zigzag Wine and Bottle Rack. Online, published date Apr. 22, 2010. Retrieved on Nov. 27, 2017 from URL: http://www.betterlivingthroughdesign.com/accessories/zigzag-wine-and-bottle-rack/.

Restriction Requirement issued for U.S. Appl. No. 29/590,403, dated Dec. 27, 2017, 8 pages.

Butterfly Wine Rack, Accessed Dec. 2, 2015.

Interlocking Panels Wine Rack, accessed Dec. 2, 2015.

Mint Inc. Wine Knot Wine Rack., https://fab.com/product/wine-knot-wine-rack-7173, accessed Dec. 2, 2015.

Mike Small on Behance., https://www.behance.net/user/?username=MikeSmall, accessed Dec. 2, 2015.

Modular Design., Icon Packaging http://www.bytesizedclasses.com/about/modular-desig/ , accessed Dec. 2, 2015.

Nucleus Modular Wine Rack is Flexible and Beautiful, http://newatlas.com/nucleus-modular-wine-rack/26990/#gallery, Accessed Dec. 2, 2015.

Sweet Potato Biscuits_Recipe_Box Shelves, Awesome and Design, https://www.pinterest.com/pin/69454019230331282/ accessed Dec. 2, 2015.

Tabletop Wine Rack in Solid Walnut 8 & 13 Bottle by Chaptico Wood., https://www.etsy.com/ca/listing/169794067/tabletop-wine-rack-in-solid- accessed Dec. 2, 2015.

Top Modular Design Selection. http://www.buymedesign.com/blog/top-modular-design-selection/ accessed Dec. 2, 2015.

Amazon.com: W Shape 8 Bottle Tabletop Wooden Wine Rack, https://www.amazon.com/Shape-Bottle-Tabletop-Wooden-Improved/dp, accessed Dec. 2, 2015.

* cited by examiner

MODULAR STORAGE RACK

FIELD

The present specification relates modular storage racks, and in particular to modular wine racks.

BACKGROUND

Many storage racks, including wine racks, are of fixed size and capacity, and cannot accommodate variations in the number of objects that can be stored in the storage rack. For example, a nine-bottle wine rack cannot accommodate ten or more bottles. A second wine rack is needed to accommodate the additional bottles. Similarly, as some of the wine bottles are removed from the rack and consumed, the wine rack can look sparsely-filled or empty.

Moreover, often the materials used to construct such racks are bulky and/or heavy to allow the rack to be able to withstand the weight of the items stored therein. In addition, many storage racks have a footprint that is relatively large compared to the amount of storage space they provide. As such, these racks take up a relatively large amount of often scarce floor or counter space compared to the amount of stored space they provide.

SUMMARY

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more. . . " language.

An aspect of the present specification provides a modular storage rack comprising: a first small flat panel and a second small flat panel, each comprising one flat segment; a first large flat panel and a second large flat panel, each comprising three flat segments. Each flat segment comprises a slit extending partway through the flat segment, the slit having a slit profile. The first large flat panel comprises a first outer flat segment, a second middle flat segment, and a third outer flat segment. The second large flat panel comprises a fourth outer flat segment, a fifth middle flat segment, and a sixth outer flat segment. The modular storage rack also comprises a first small cross panel and a second small cross panel, each comprising one cross segment; and a first large cross panel and a second large cross panel, each comprising three cross segments. Each cross segment comprises: a first planar portion terminating in a first lip oriented out of a first plane of the first planar portion; a second planar portion terminating in a second lip oriented out of a second plane of the second planar portion; the first lip facing the second lip, the first lip and the second lip defining a slot for receiving the flat segment; and an island joining the first planar portion to the second planar portion, the island disposed in the slot and between the first lip and the second lip, the island having an outer perimeter matching the slit profile, the island configured to be received in the slit. The first large cross panel comprising a first outer cross segment, a second middle cross segment, and a third outer cross segment; and the second large cross panel comprising a fourth outer cross segment, a fifth middle cross segment, and a sixth outer cross segment. Each given flat segment matingly connected to a corresponding cross segment such that the given flat segment is received in the slot of the corresponding cross segment and the island of the corresponding cross segment is received in the slit of the given flat segment, wherein: the first outer cross segment is matingly connected to the flat segment of the first small flat panel; the second middle cross segment is matingly connected to the second middle flat segment; the first outer flat segment is matingly connected to the cross segment of the first small cross panel; the third outer cross segment is matingly connected to the fourth outer flat segment; the third outer flat segment is matingly connected to the fourth outer cross segment; the fifth middle flat segment is matingly connected to the fifth middle cross segment; the sixth outer cross segment is matingly connected to the flat segment of the second small flat panel; and the sixth outer flat segment is matingly connected to the cross segment of the second small cross panel.

The modular storage rack can comprise a wine rack.

The slit profile can comprise a width of the slit being inconstant along a length of the slit.

The slit profile can comprise a first region where the width of the slit decreases along a length of the slit, a second region where the width of the slit is constant along the length of the slit, and a third region where the width of the slit decreases along the length of the slit.

The modular storage rack can further comprise a base for supporting the modular storage rack, the base comprising a planar base portion for resting on an external support, the planar base portion terminating in two support lips extending out of a corresponding plane of the planar based portion, each support lip extending from a corresponding edge of the planar base portion, the support lips opposite one another, the support lips configured to prevent the first outer cross segment and the first outer flat segment of the modular storage rack from splaying outwards.

Another aspect of the present specification provides a modular storage rack comprising: two small flat panels each comprising one flat segment; two small cross panels each comprising one cross segment; one large flat panel comprising three flat segments; and one large cross panel comprising three cross segments. Each flat segment comprises a slit extending partway through the flat segment, the slit having a slit profile. Each cross segment comprises: a first planar portion terminating in a first lip oriented out of a first plane of the first planar portion; a second planar portion terminating in a second lip oriented out of a second plane of the second planar portion; the first lip facing the second lip, the first lip and the second lip defining a slot for receiving the flat segment; and an island joining the first planar portion to the second planar portion, the island disposed in the slot and between the first lip and the second lip, the island having an outer perimeter matching the slit profile, the island configured to be received in the slit. Each given flat segment matingly connected to a corresponding cross segment such that the given flat segment is received in the slot of the corresponding cross segment and the island of the corresponding cross segment is received in the slit of the given flat segment.

The slit profile can comprise a width of the slit being inconstant along a length of the slit.

The slit profile can comprise a first region where the width of the slit decreases along the length of the slit, a second region where the width of the slit is constant along the length of the slit, and a third region where the width of the slit decreases along the length of the slit.

The modular storage rack can further comprising a base for supporting the modular storage rack, the base comprising a planar base portion for resting on an external support, the planar base portion terminating in two support lips extending out of a corresponding plane of the planar based portion, each support lip extending from a corresponding edge of the planar base portion, the support lips opposite one another, the support lips configured to prevent the flat and cross segments of the modular storage rack from splaying outwards.

Another aspect of the present specification provides a kit for assembling a modular storage rack, the kit comprising: two small flat panels each comprising one flat segment; two small cross panels each comprising one cross segment; one large flat panel comprising three flat segments; and one large cross panel comprising three cross segments. Each flat segment comprises a slit extending partway through the flat segment, the slit having a slit profile. Each cross segment comprises: a first planar portion terminating in a first lip oriented out of a first plane of the first planar portion; a second planar portion terminating in a second lip oriented out of a second plane of the second planar portion; the first lip facing the second lip, the first lip and the second lip defining a slot for receiving the flat segment; and an island joining the first planar portion to the second planar portion, the island disposed in the slot and between the first lip and the second lip, the island having an outer perimeter matching the slit profile, the island configured to be received in the slit. Each given flat segment is configured to matingly connect to a corresponding cross segment such that the given flat segment is received in the slot of the corresponding cross segment and the island of the corresponding cross segment is received in the slit of the given flat segment.

The kit can further comprise one additional large flat panel comprising three flat segments; and one additional large cross panel comprising three cross segments.

The slit profile can comprise a width of the slit being inconstant along a length of the slit.

The slit profile can comprise a first region where the width of the slit decreases along the length of the slit, a second region where the width of the slit is constant along the length of the slit, and a third region where the width of the slit decreases along the length of the slit.

The kit can further comprise a base for supporting the modular storage rack, the base comprising a planar base portion for resting on an external support, the planar base portion terminating in two support lips extending out of a corresponding plane of the planar based portion, each support lip extending from a corresponding edge of the planar base portion, the support lips opposite one another, the support lips configured to prevent the flat and cross segments of the modular storage rack from splaying outwards.

The kit can further comprise one or more of: an extended flat panel comprising five flat segments; and an extended cross panel comprising five cross segments.

BRIEF DESCRIPTION OF THE DRAWINGS

Preferred implementations of the present specification will now be described, by way of example only, with reference to the attached Figures, wherein.

DETAILED DESCRIPTION

Figure 1:
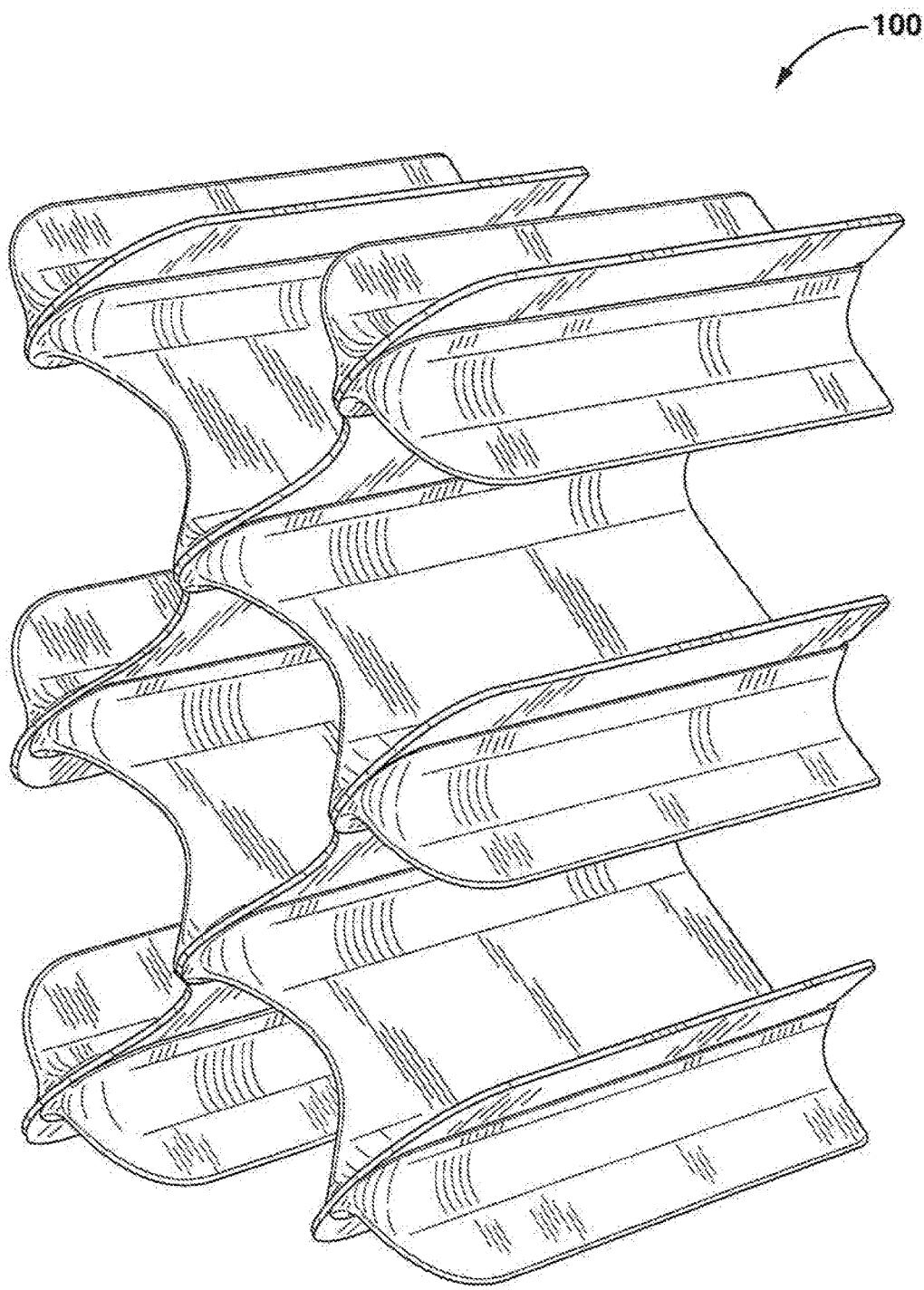
FIG. 1 shows a top perspective view of a modular storage rack, according to non-limiting implementations.

FIG. 1 shows a top perspective view of an exemplary implementation of the modular storage rack 100. Storage rack 100 can be used to store and/or display a variety of objects, including but not limited to wine bottles or other types of bottles.

Figure 2:
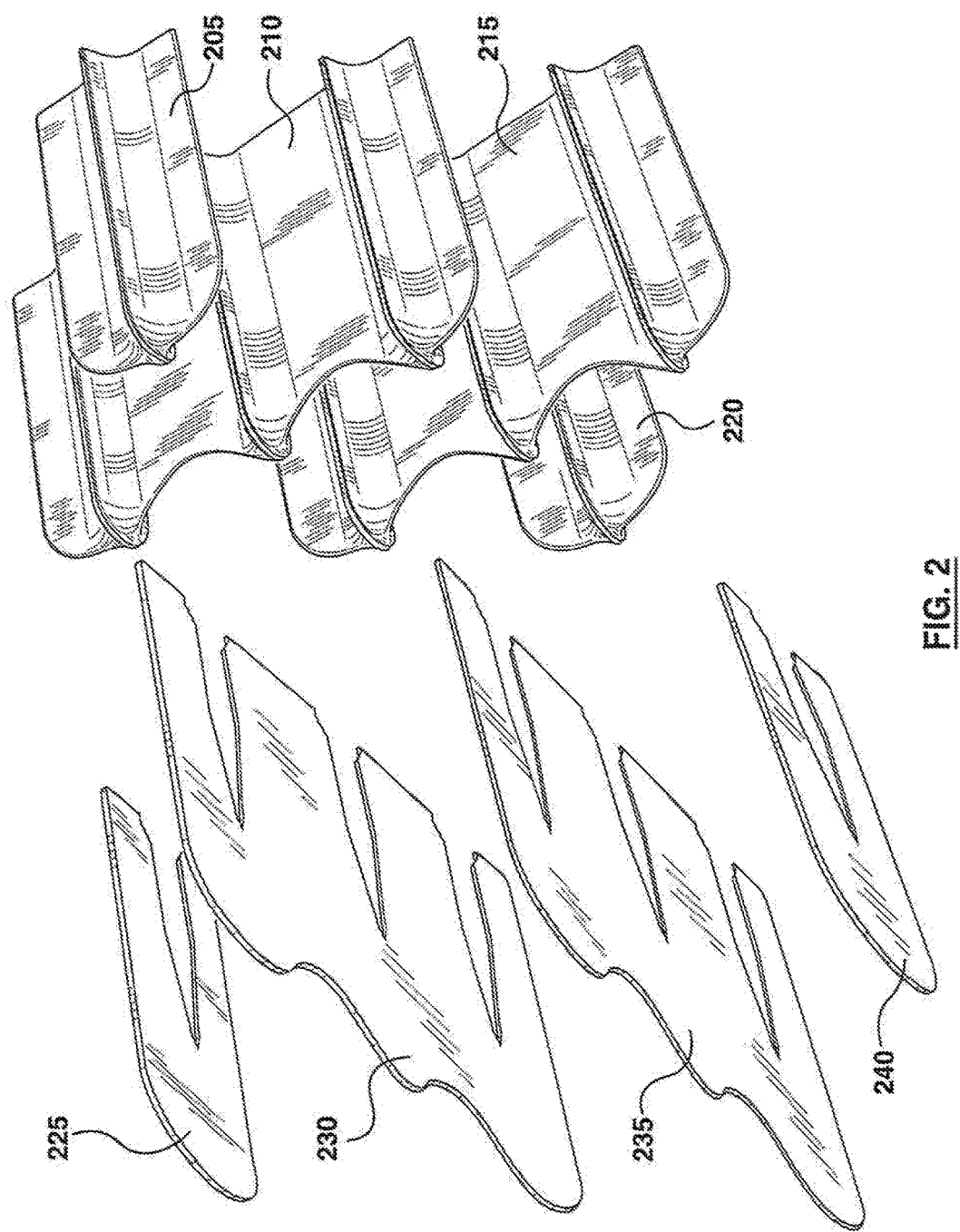
FIG. 2 shows a perspective view of the disassembled components of the modular storage rack of FIG. 1.

FIG. 2 shows the disassembled components of storage rack 100. These components include two small cross panels 205, 220 each comprising one cross segment, two large cross panels 210, 215 each comprising three cross segments, two small flat panels 225, 240 each comprising one flat segment, and two large flat panels 230, 235 each comprising three flat segments. These cross and flat panels can be made of plastics, metals, or any other suitable material. The flat panels and the cross panels matingly connect with one another to form storage rack 100, as will be discussed in greater detail below.

Figure 3:
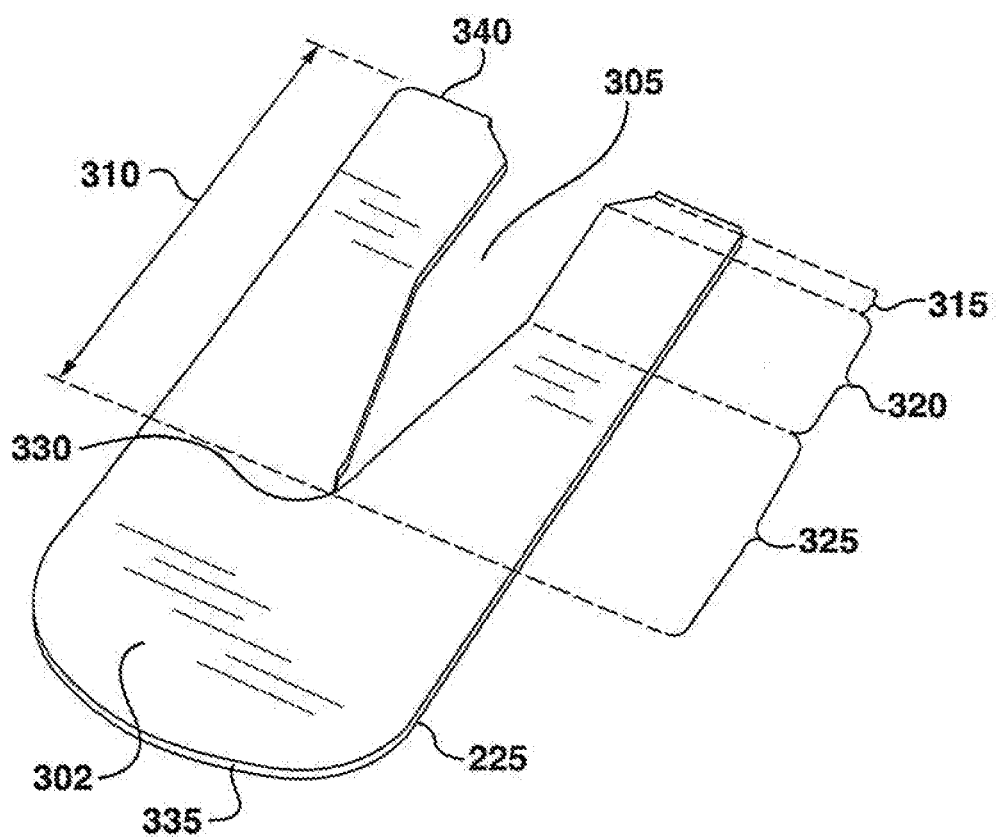
FIG. 3 shows a top perspective view of a small flat panel, according to non-limiting implementations.

FIG. 3 shows a top perspective view of small flat panel 225, which is the same as one flat segment. All the small flat panels have the same structure. The large flat panels comprise three flat panels (or flat segments) positioned side-by-side. In other words, the large flat panels comprise two outer flat segments and a middle flat segment. Small flat panel 225 comprises a planar portion 302 and a slit 305 extending partway through planar portion 302 of the flat segment. Slit 305 has a particular shape and/or slit profile. In some implementations, the width of slit 305 can be inconstant along the length 310 of slit 305. A slit with an inconstant width can comprise any slit where the width of the slit is not constant along the full length of the slit.

For example, as shown in FIG. 3, the width of the slit 305 can be different in different regions along length 310 of slit 305: in a first region 315, the width can decrease along length 310, in a second region 320 the width can remain constant along length 310, and in a third region 325 the width can decrease along length 310 of slit 305. It is contemplated that slit 305 can have any suitable slit profile and/or the width of slit 305 can remain constant or change in any suitable manner along length 310 of slit 305.

In some implementations, slit 305 can terminate in tip 330. While FIG. 3 shows tip 330 being pointed, it is contemplated that in some implementations tip 330 can be rounded. In some implementations, tip 330 can have a radius of curvature that is in the range of about 2 mm to about 5 mm. A rounded tip can be less prone to becoming a stress concentration point and acting as a starting point for cracks.

As shown in FIG. 3, flat panel 225 can have a rounded front edge 335 and a flat back edge 340. One or more of the other flat panels can also have rounded front edges and straight back edges, as shown in FIG. 2. Moreover, although FIG. 3 shows flat panel 225 having a rounded front edge 335 and a flat back edge 340, it is contemplated that front edge 335 and back edge 340 can have any suitable shape including, but not limited to, both being flat, both being rounded, and one or both of them being of any other straight, bent, or curved shape.

Figure 4:
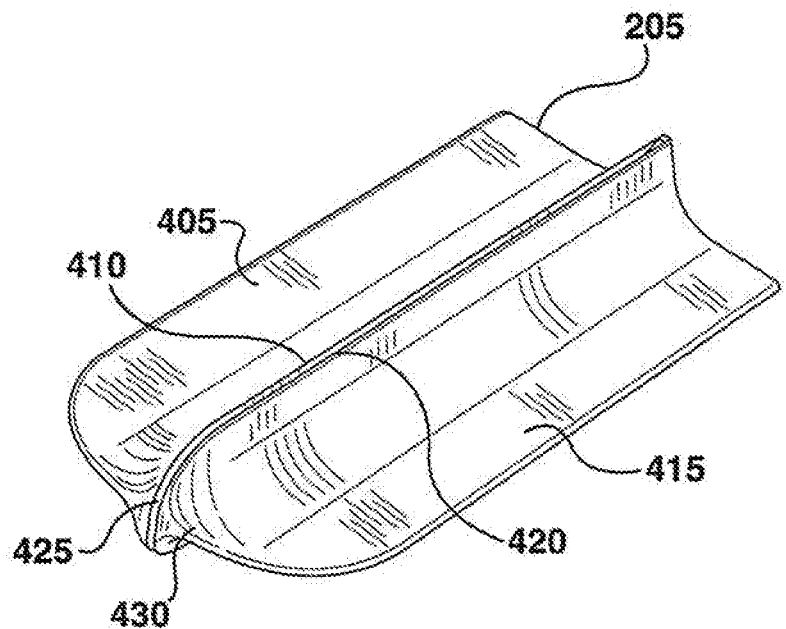
FIG. 4 shows a top perspective view of a small cross panel, according to non-limiting implementations.

FIG. 4 shows a front perspective view of small cross panel 205, which is the same as one cross segment. All the small cross panels have the same structure. The large cross panels comprise three cross panels (or cross segments) positioned side-by-side. In other words, the large cross panels comprise two outer cross segments and a middle cross segment.

Small cross panel 205 (or cross segment) comprises a first planar portion 405 terminating in a first lip 410 oriented out of a first plane of first planar portion 405. Small cross panel 205 similarly comprises a second planar portion 415 terminating in a second lip 420 oriented out of a second plane of second planar portion 415. First lip 410 faces second lip 420, and the two lips together define a slot 425 which can be shaped and/or sized for receiving a flat segment such as small flat panel 225. Slot 425 can be shaped and/or sized to receive planar portion 302 of flat panel 225. In some implementations, small cross panel 205 can comprise a rounded front 430. One or more of the other cross panels can also have rounded fronts.

Figure 5:
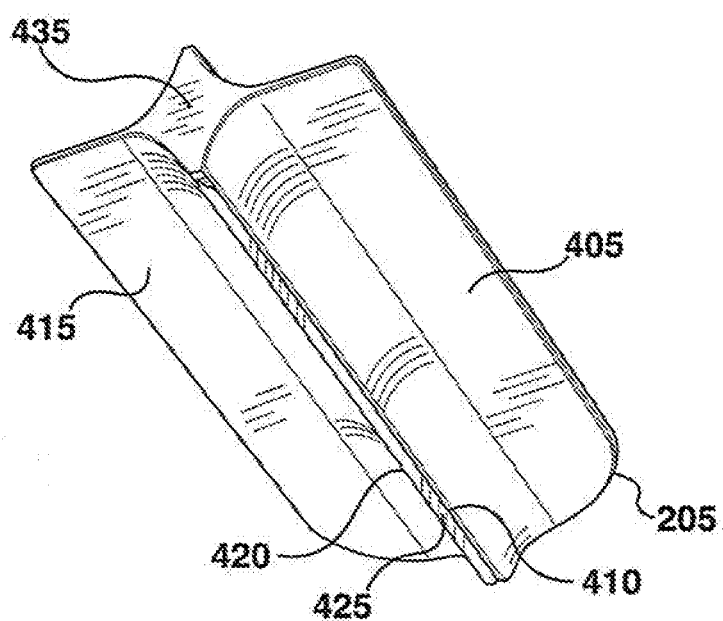
FIG. 5 shows a bottom perspective view of the small cross panel of FIG. 4.

FIG. 5 shows a back perspective view of small cross panel 205. In some implementations, small cross panel 205 can have a flat back 435. One or more of the other cross panels can also have flat backs. In some implementations, first lip 410 and second lip 420 can be about parallel to one another. In addition, while first lip 410 and second lip 420 are shown as being perpendicular to first and second planar portions 405, 415, it is contemplated that in some implementations, first lip 410 and second lip 420 can be disposed at an angle other than 90° relative to first and second planar portions 405, 415.

In the implementations shown in the Figures, first lip 410 and second lip 420 are integrally formed with the other portions of the cross segments such as the first and second planar portions 405, 415. It is contemplated that in other implementations, one or more of the first lip and the second lip can comprise a separately-formed component which is then secured to the first and second planar portions 405, 415.

Slot 425 formed by first lip 410 and second lip 420 is configured to receive and support the planar segments. The angle and/or orientation of slot 425 (and of first lip 410 and second lip 420) determines the angle of the cross panels relative to the flat panels when the storage rack is assembled. In the implementations shown in the figures, the angle between the cross panels and the flat panels is about 90°.

Figure 6:
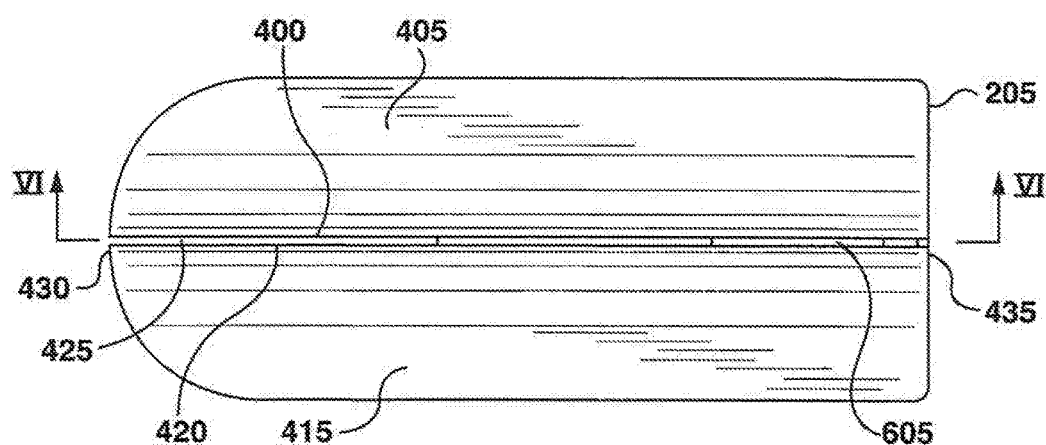
FIG. 6 shows a side elevation view of the small cross panel of FIG. 4.

FIG. 6 depicts a side elevation view of small cross panel 205, showing slot 425 formed between first lip 410 and second lip 420. Small cross panel 205 also comprises an island 605 which joins first planar portion 405 to second planar portion 415. Island 605 is disposed in slot 425 and between first lip 410 and second lip 420. In FIG. 6, island 605 is integrally formed with first and second planar portions 405, 415. In other implementations, the island can comprise a separately-formed component secured to first and second planar portions 405, 415.

FIG. 6 also shows the rounded front 430 and flat back 435 of small cross panel 205. While small cross panel 205 is shown with a rounded front 430 and a flat back 435, it is contemplated that the front and back can have any suitable shape; for example, both the front and the back can be rounded or flat, or they can have any other shape that can be the same as or different from one another.

Figure 7:
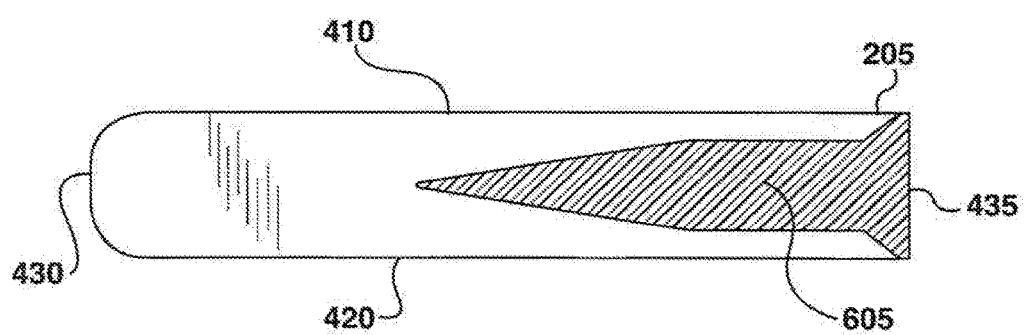
FIG. 7 shows a cross-section of the small panel of FIG. 4 along line VI-VI marked in FIG. 6.

FIG. 7 shows a cross-sectional view of small cross panel 205 along line VI-VI marked in FIG. 6. FIG. 7 shows first lip 410, second lip 420, and island 605 disposed between first lip 410 and second lip 420. Island 605 can have an outer perimeter that about matches the slit profile of slit 305 (shown in FIG. 3). As such, island 605 can be configured to be received in slit 305 when small cross panel 205 matingly connects with small flat panel 225. In fact, any flat segment and cross segment of the flat and cross panels respectively can matingly connect in this manner. Island 605 being received in slit 305 can further secure the mating connection between flat and cross segments and reduce movement or play between flat and cross segments when they are matingly connected to one another.

The combination of the slot defined by the first and second lips, and the slit and island having complementary shapes can allow the flat and cross segments to form a secure and strong mating connection without either of the flat segments or the planar portions of the cross segments having to be very thick. In other words, the combination of the slot defined by the lips and the complementary island and slit shapes can allow relatively thin flat segments and planar portions (of cross segments) to form secure and strong mating connections. In addition, these mating connections can be reversible allowing for the storage rack to be disassembled (e.g. to facilitate shipping and/or storage) and then easily re-assembled for use.

Figure 8A:
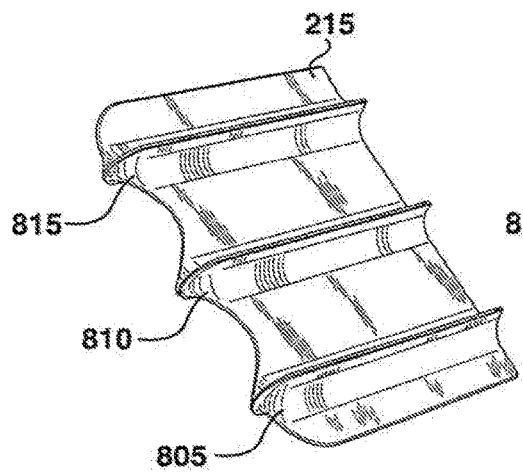
FIGS. 8A, 8B, 8C, 8D, 8E, 8F, 8G, and 8H shows various steps in assembling the modular storage rack of FIG. 1.
Figure 8B:
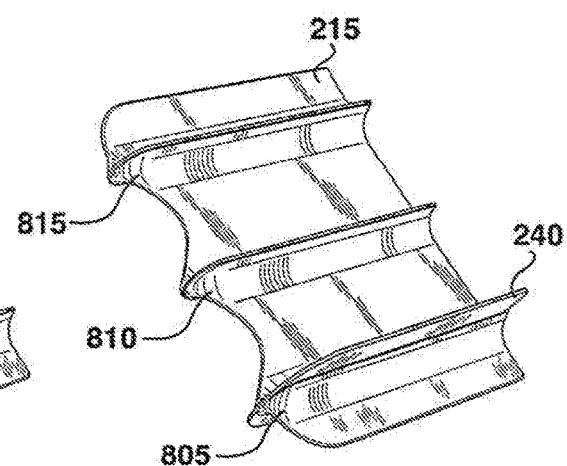
Figure 8C:
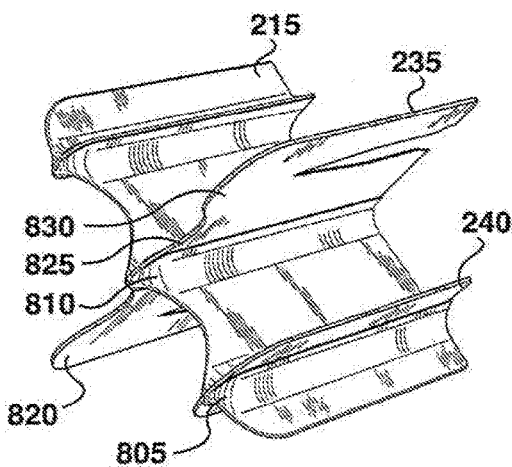

FIGS. 8A, B, C, D, E, F, G, and H show various stages of assembling storage rack 100 from its constituent flat and cross panels. FIG. 8A shows large cross panel 215 comprising outer cross segment 850, middle cross segment 810, and outer cross segment 815. In FIG. 8B, small flat panel 240 is matingly connected to outer cross segment 805. FIG. 8C shows the addition of large flat panel 235 comprising outer flat segment 820, middle flat segment 825, and outer flat segment 830. Middle flat segment 825 is matingly connected to middle cross segment 810.

Figure 8D:
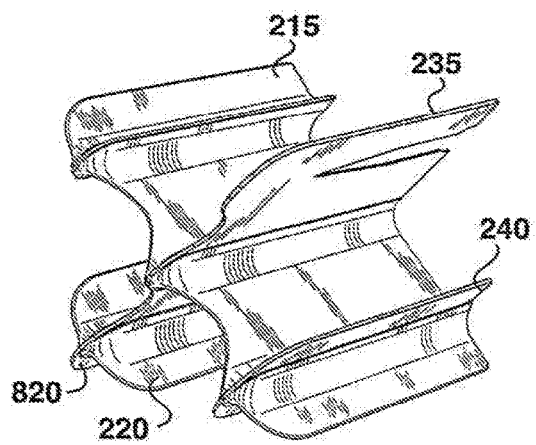
Figure 8E:
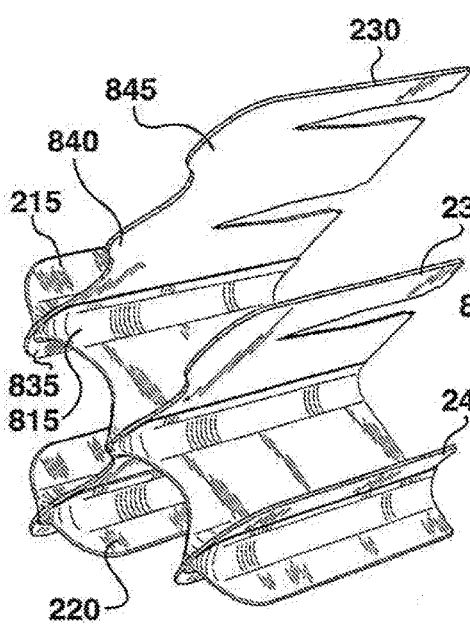
Figure 8F:
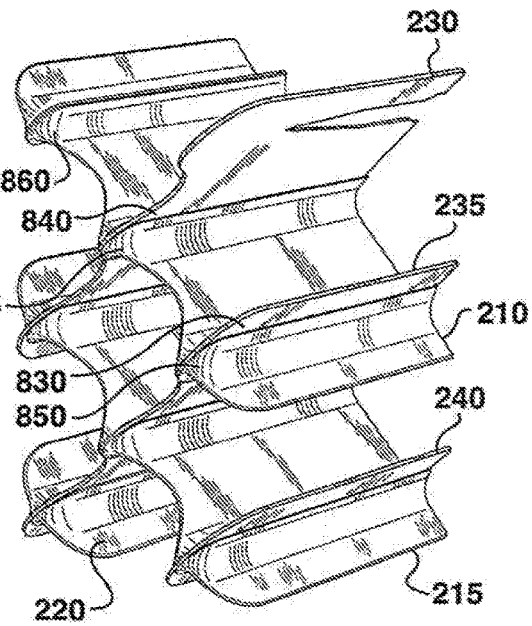

FIG. 8D shows the addition of small cross panel 220, which is matingly connected to outer flat segment 820 of large flat panel 235. FIG. 8E shows the addition of large flat panel 230 comprising outer flat segment 835, middle flat segment 840, and outer flat segment 845. Outer flat segment 835 is matingly connected to outer cross segment 815 of large cross panel 215. FIG. 8F shows the addition of large cross panel 210 comprising outer cross segment 850, middle cross segment 855, and outer cross segment 860. Outer cross segment 850 is matingly connected to outer flat segment 830 of large flat panel 235. Middle cross segment 855 is matingly connected to middle flat segment 840 of large flat panel 230.

Figure 8G:
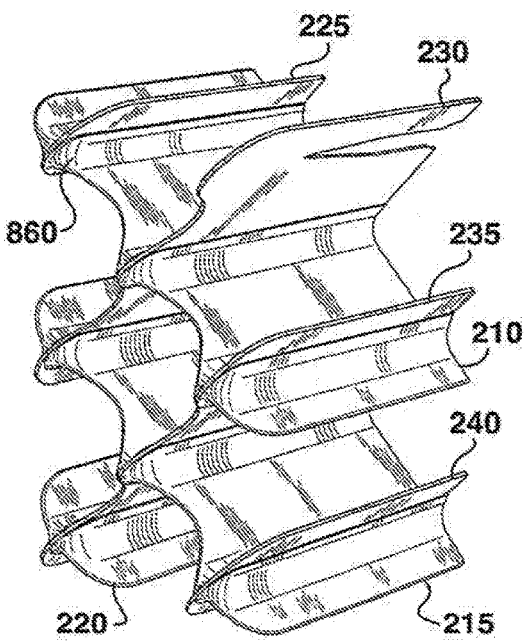
Figure 8H:
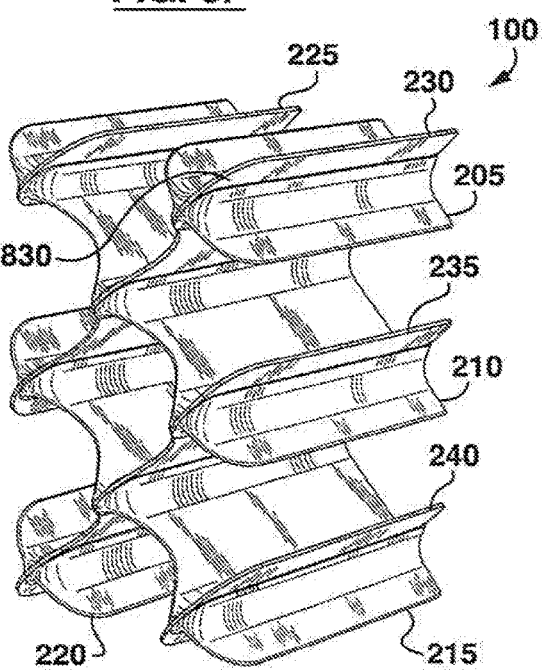

FIG. 8G shows the addition of small flat panel 225, which is matingly connected to outer cross segment 860 of large cross panel 210. FIG. 8H shows the addition of small cross panel 2051, which is matingly connected to outer flat segment 830 of large flat panel 230 to form storage rack 100.

While FIGS. 8A-H depict a particular order of assembling the flat and cross panels to form storage rack 100, it is contemplated that the flat and cross panels can be assembled in a different order. In addition, it is contemplated that the flat and cross panels can be assembled in a manner that can result in a storage rack shaped differently than storage rack 100.

Figure 9:
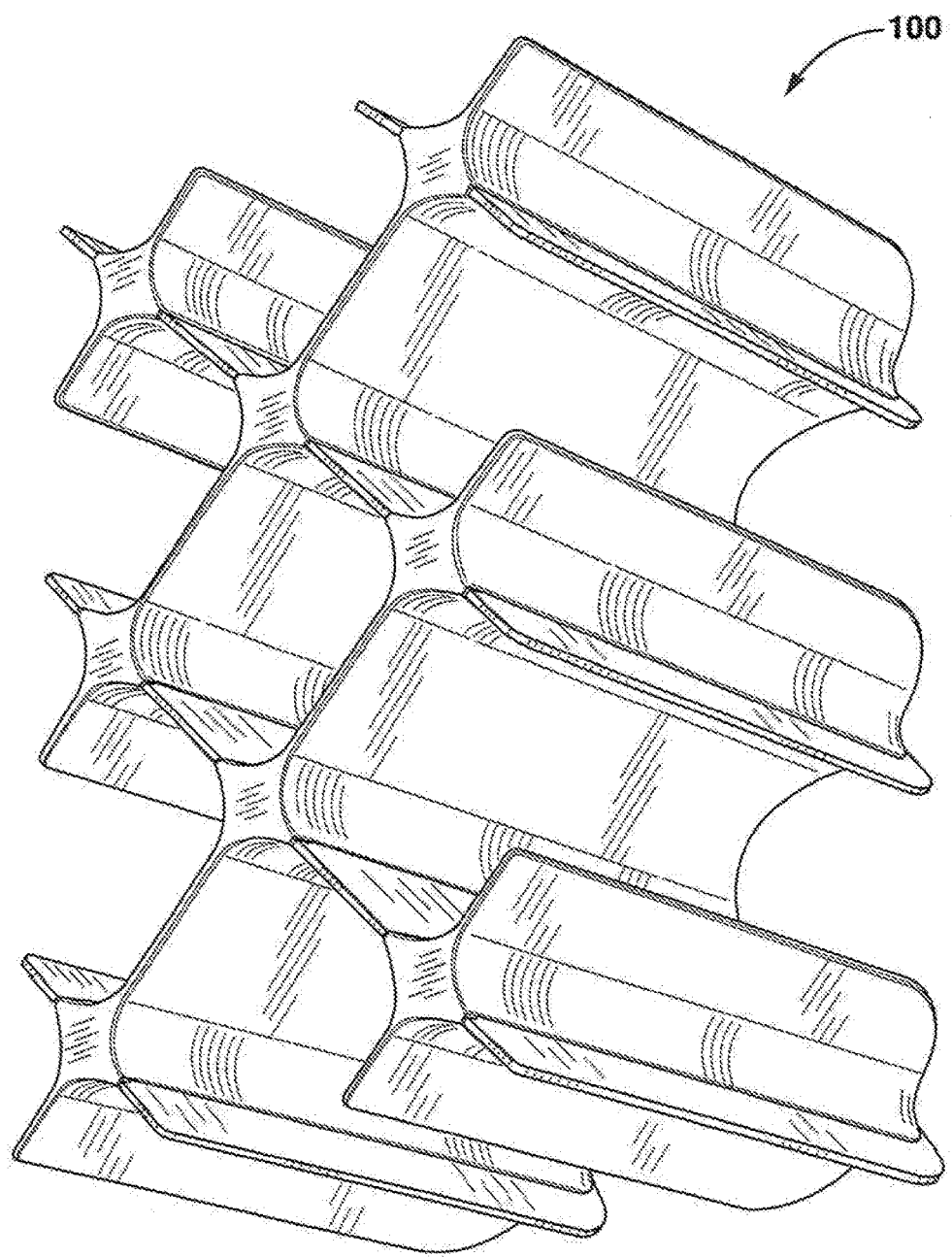
FIG. 9 shows a bottom perspective view of the modular storage rack of FIG. 1.
Figure 10:
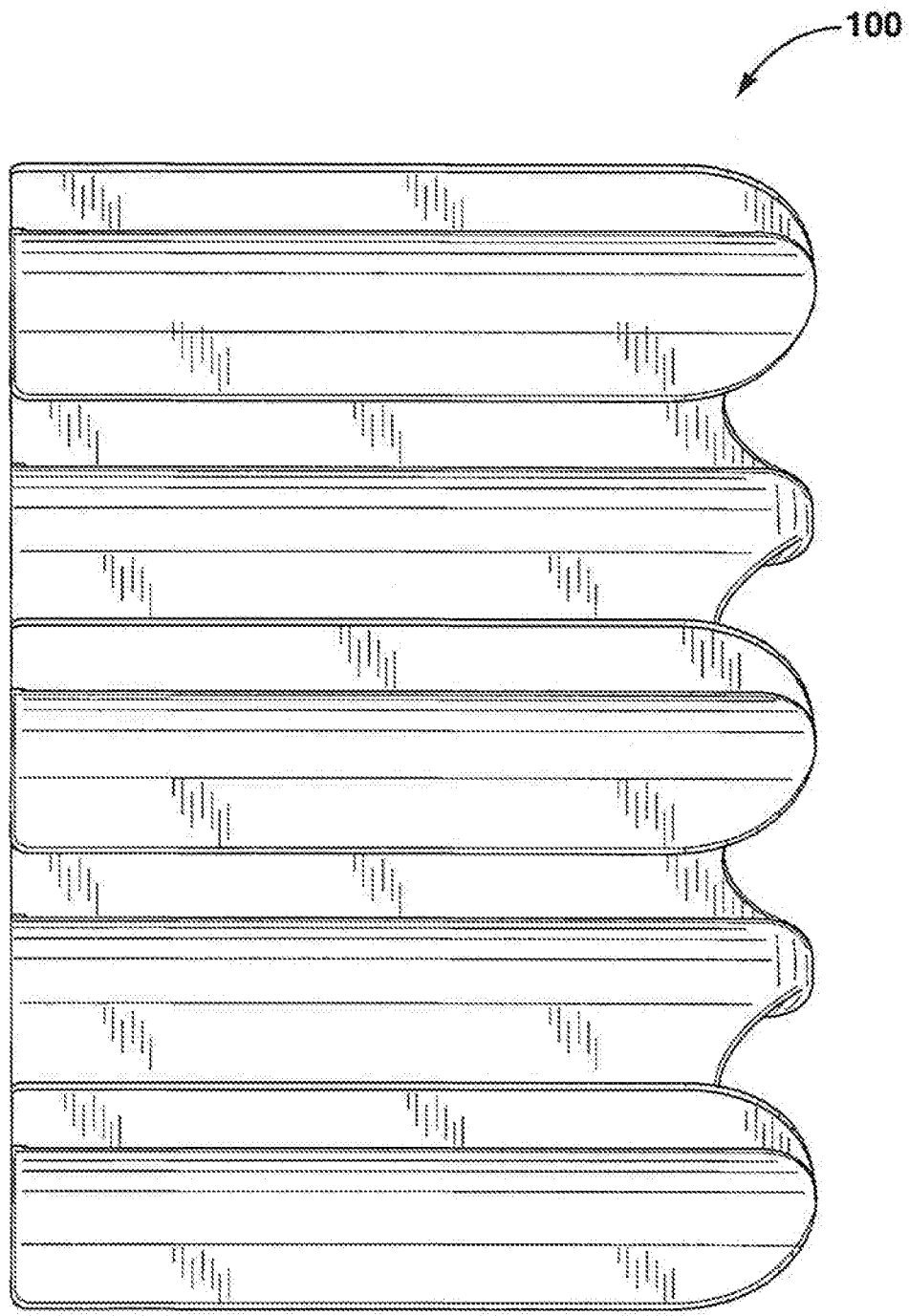
FIG. 10 shows a left side elevation view of the modular storage rack of FIG. 1.
Figure 11:
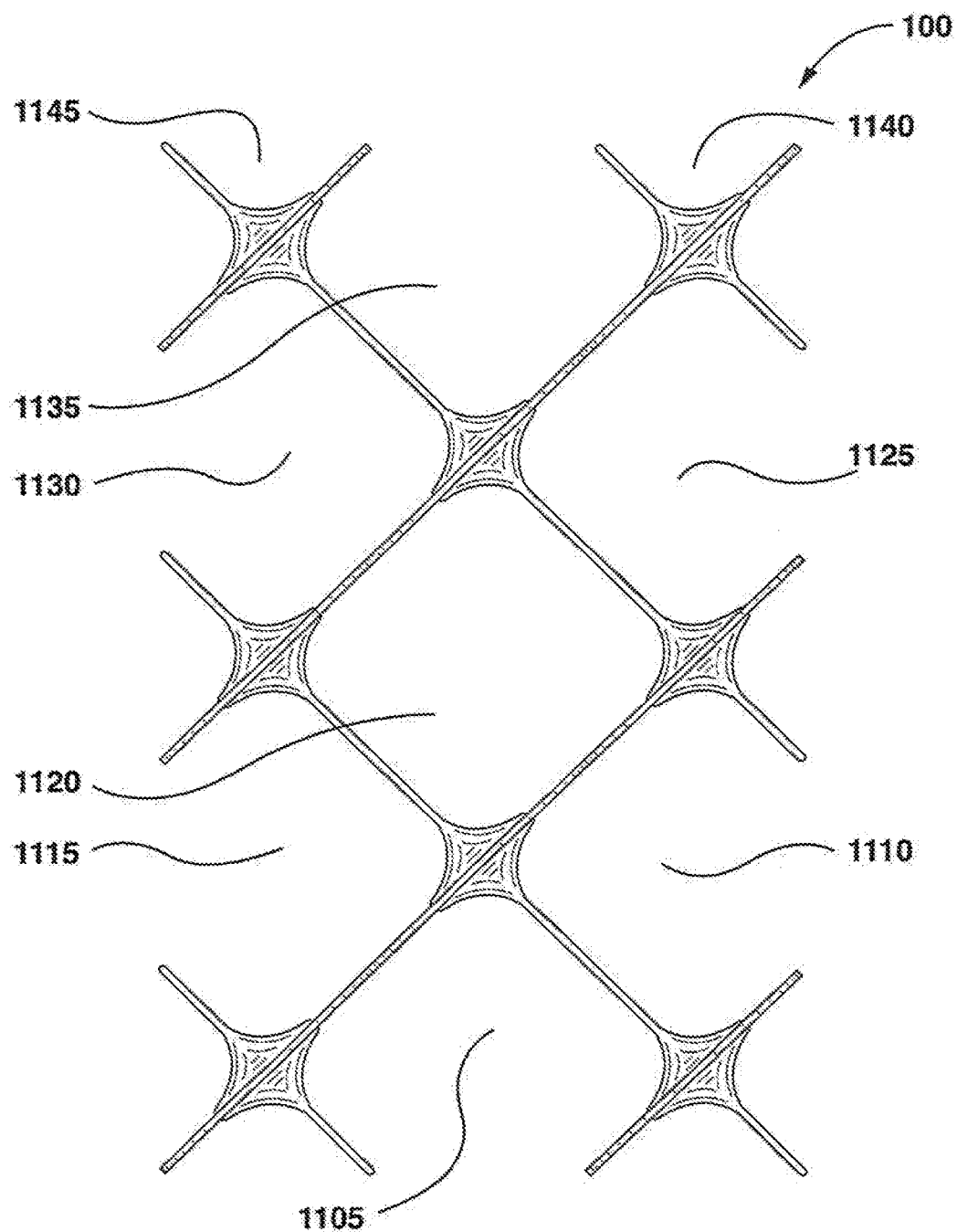
FIG. 11 shows a front side elevation view of the modular storage rack of FIG. 1.

FIG. 9 shows a bottom perspective view of storage rack 100. FIG. 10 shows a left side elevation view of storage rack 100. FIG. 11 shows a front side elevation view of storage rack 100. It can be seem that storage rack 100 defines nine spaces 1105, 1110, 1115, 1120, 1125, 1130, 1135, 1140, and 1145 where wine bottle and/or other objects can be stored. If bottles in spaces 1135, 1140, and 1145 are removed from storage rack 100 and consumed, storage rack 100 can be modified as described below to reduce its capacity so that the storage rack does not look sparsely-filled and/or empty.

To modify storage rack 100 to reduce its capacity, first the assembly steps shown in FIGS. 8E-H can be performed in reverse to disassemble part of storage rack 100. In other words, first, small cross panel 205 can be removed from large flat panel 230. Next, small flat panel 225 can be removed from large cross panel 210. Next, large cross panel 210 can be removed from large flat panels 230 and 235. Then, large flat panel 230 can be removed from large cross panel 215. At this point, the partially disassembled storage rack can resemble the partial rack shown in FIG. 8D.

To this partial rack, small flat panel 225 can be added by matingly connecting small flat panel 225 to outer cross segment 815 of large cross panel 215. Then, small cross panel 205 can be matingly connected to outer flat segment 830 of large flat panel 235. The resulting modified rack (not shown) has space for six bottle (or other objects) corresponding to spaces 1105, 1110, 1115, 1120, 1125, and 1130 as shown in FIG. 11. Such a modified storage rack represents another implementation of the present specification, where the rack is assembled from two small flat panels, one large flat panel, two small cross panels, and one large cross panel as described above.

As described above, disassembling and re-assembling the flat and cross panels can be used to modify the size, shape, and/or capacity of the storage rack. As such, the storage rack is a modular storage rack. While only two specific implementations of the storage rack (nine- and six-bottle implementations) are described herein, it is contemplated that storage racks having different shapes, sizes, and/or capacities can be made using different numbers and combinations of the large and small flat and cross panels described herein.

Moreover, in some implementations, extended flat and cross panels, each comprising five flat and five cross segments respectively, can be used to assemble storage racks of different and/or larger sizes and/or capacities. In yet other implementations, flat and cross panels having two, four, and/or more than five flat and cross segments respectively can be used to assemble storage racks of varying sizes, shapes, and/or capacities.

Each of these sizes, shapes, and/or capacities of the storage rack (including, but not limited to, the nine-bottle storage rack 100 and the six-bottle variety described herein) can be provided in a disassembled kit of flat and cross panels, which panels can then be assembled by matingly connecting each flat panel with a corresponding cross panel to form the assembled storage rack.

Figure 12:
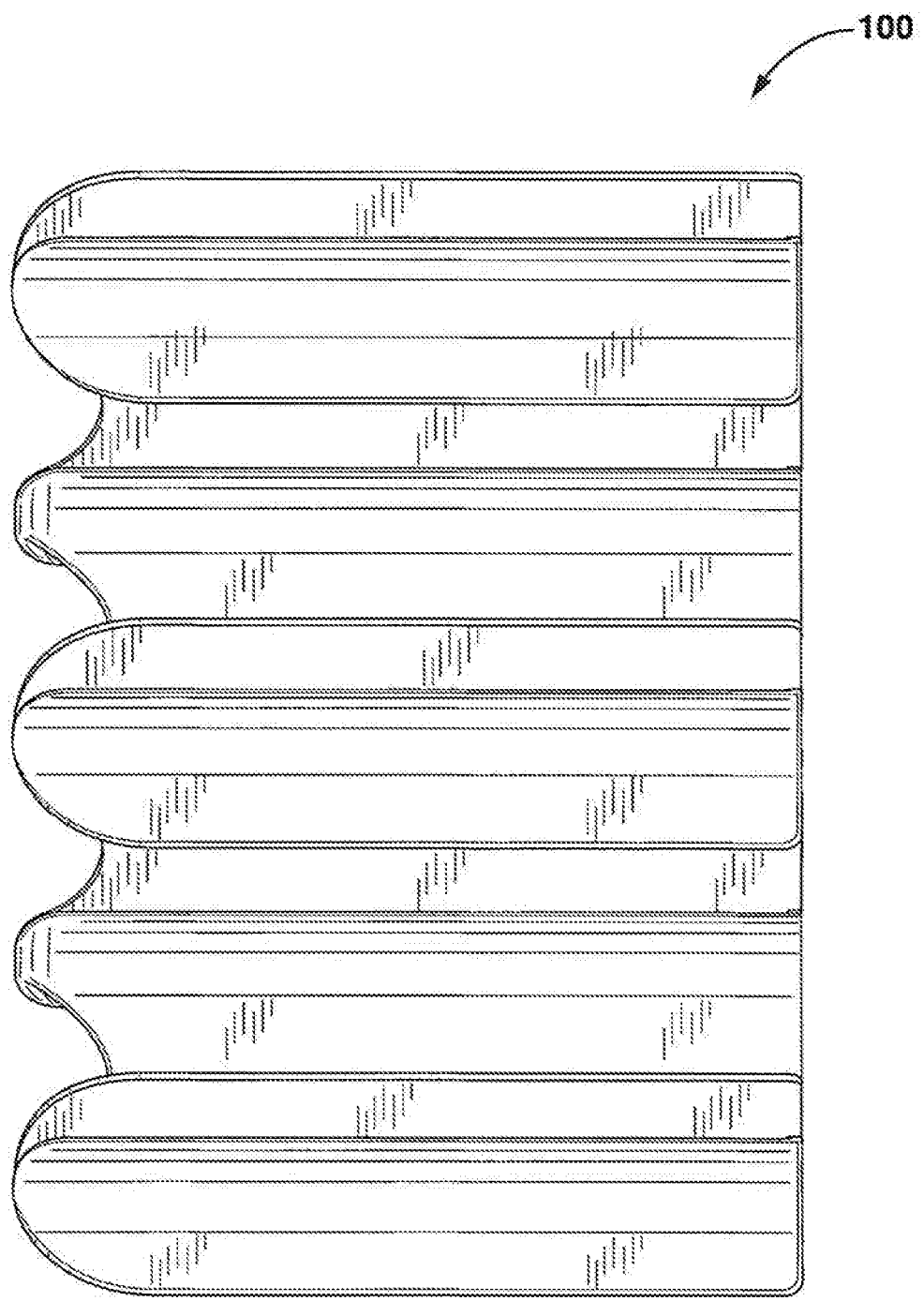
FIG. 12 shows a right side elevation view of the modular storage rack of FIG. 1.
Figure 13:
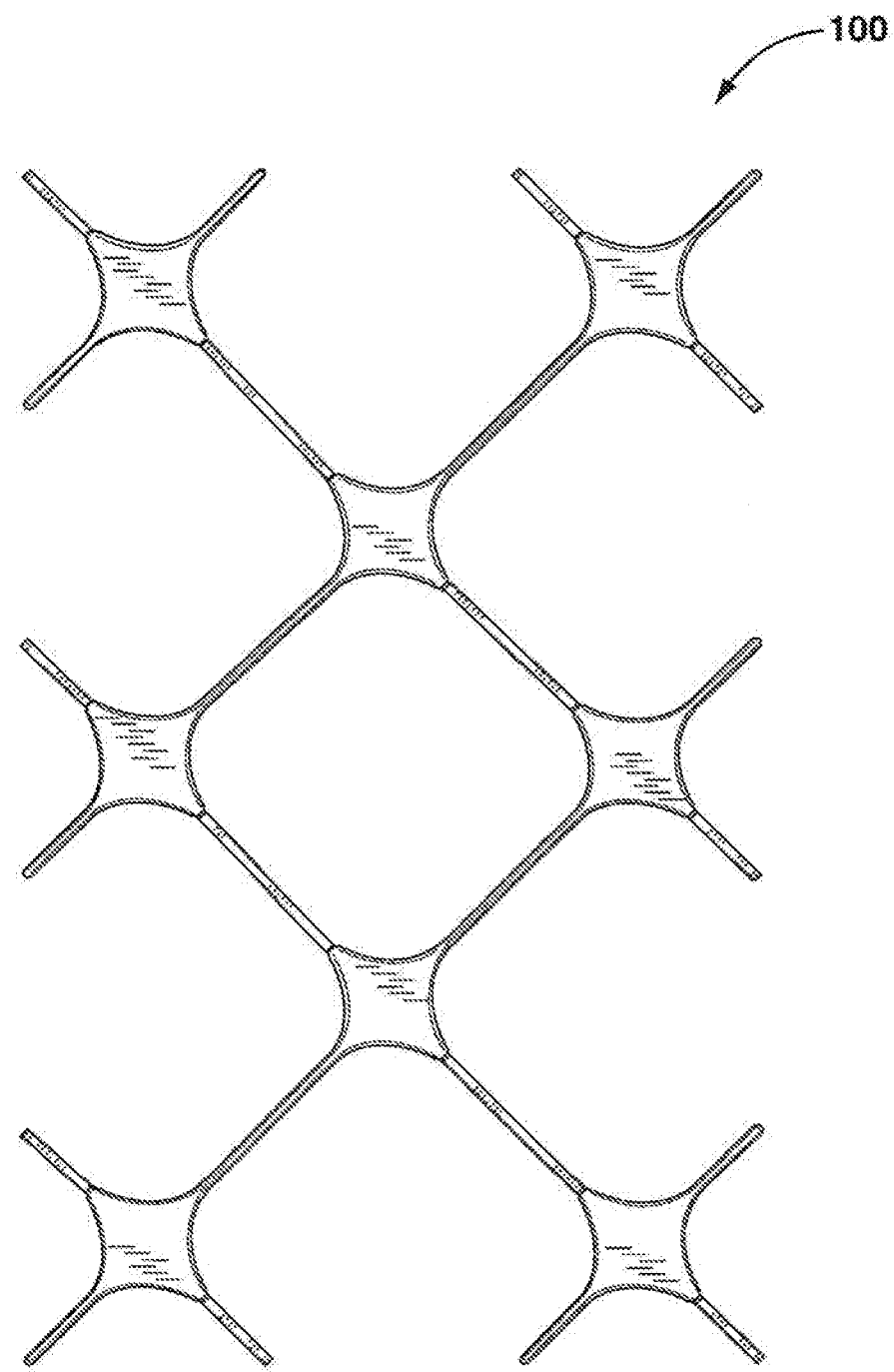
FIG. 13 shows a back side elevation view of the modular storage rack of FIG. 1.
Figure 14:
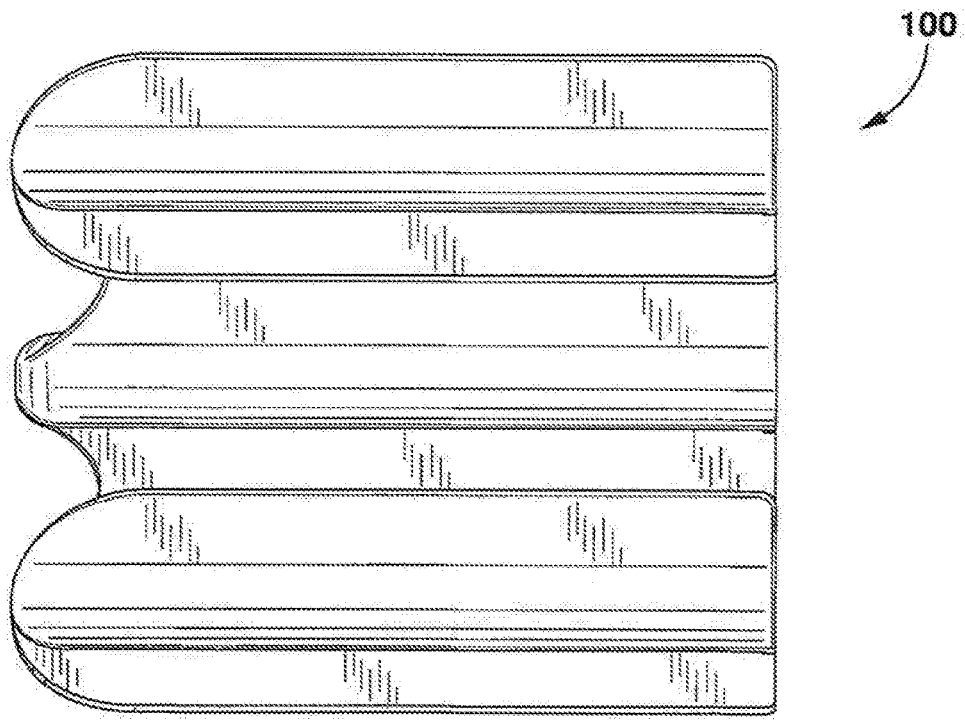
FIG. 14 shows a top plan view of the modular storage rack of FIG. 1.
Figure 15:
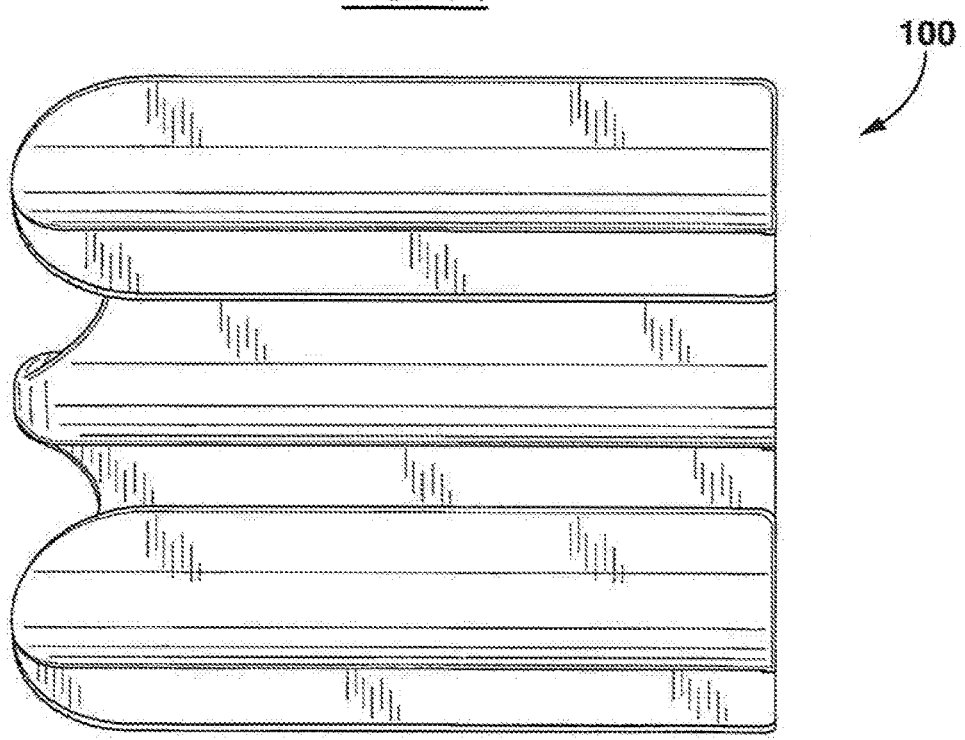
FIG. 15 shows a bottom plan view of the modular storage rack of FIG. 1.

Returning to storage rack 100, FIG. 12 shows a right side elevation view of storage rack 100. FIG. 13 shows a back side elevation view of storage rack 100. FIG. 14 shows a top plan view of storage rack 100. FIG. 15 shows a bottom plan view of storage rack 100.

While the Figures show the flat segments as being flat sheets, and the planar portions of the cross segments as being flat sheets, it is contemplated that one or more of the flat segments and the planar portions of the cross segments can be curved, bent, or can have any other suitable shape.

Figure 16:
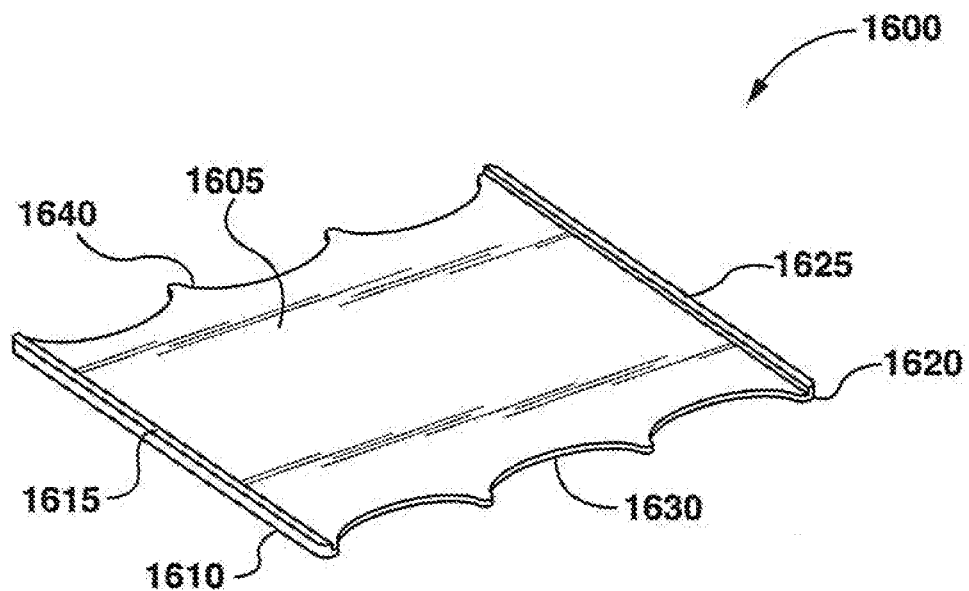
FIG. 16 shows a top perspective view of a base for supporting a modular storage rack, according to non-limiting implementations.

Turning now to FIG. 16, a top perspective view of a base 1600 is shown. Base 1600 can be used for supporting the storage rack. Base 1600 comprises a planar base portion 1605 configured for resting on an external support, including but not limited to a countertop, a tabletop, and the like. Planar base portion can comprise edges 1610 and 1620 being opposite one another, and edges 1630 and 1640. A support lip 1615 can extend from edge 1610 of planar base portion 1605 and out of the plane defined by planar base portion 1605. Likewise, another support lip 1625 can extend from edge 1620 of planar base portion 1605 and out of the plane defined by planar base portion 1605. Support lip 1615 and support lip 1625 can be opposite one another, in the sense that support lips 1615,1625 can extend from opposite edges 1610 and 1620 of planar base portion 1605 respectively. Other edges 1630 and 1640 of planar base portion 1605 can have any suitable shape. For example, as shown in FIG. 16, edges 1630 and 1640 can have a scalloped shape to correspond with the shape of the storage rack supported on base 1600.

Figure 17:
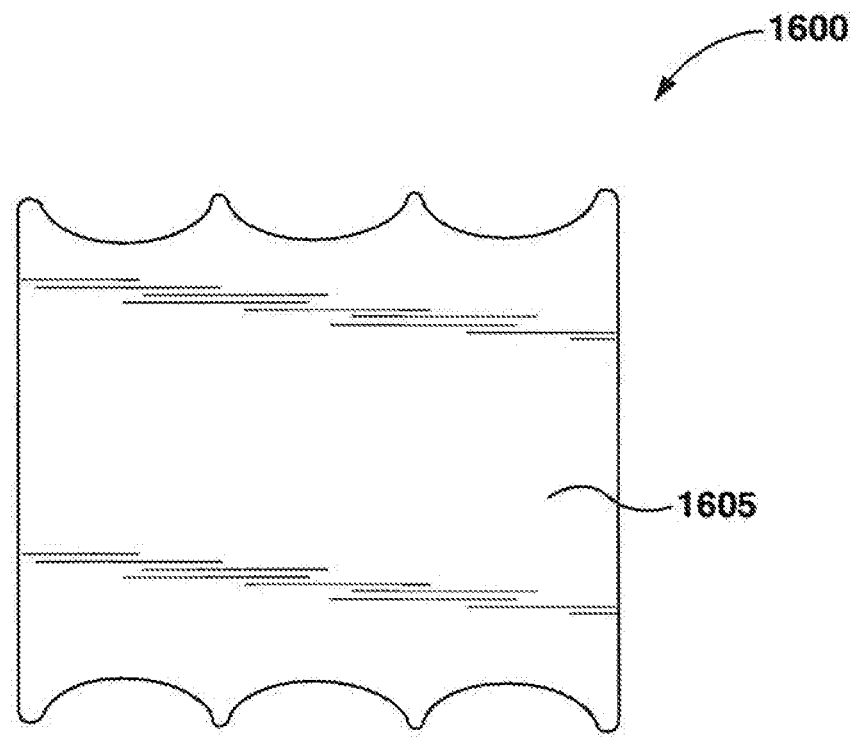
FIG. 17 shows a bottom plan view of the base of FIG. 16.
Figure 18:
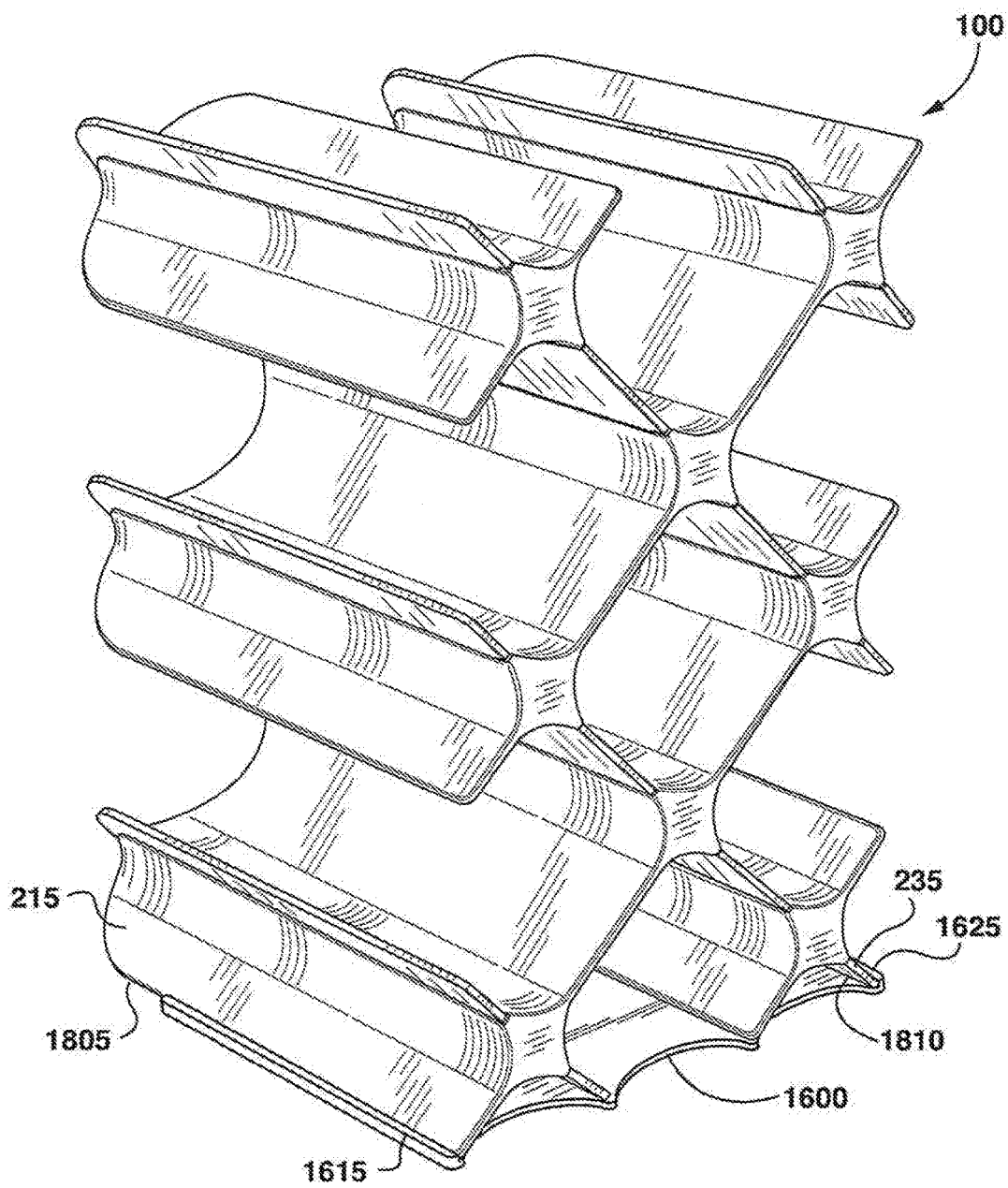
FIG. 18 shows a top perspective view of the modular storage rack of FIG. 1 resting on and supported by the base of FIG. 16.

FIG. 17 shows a bottom plan view of base 1600. FIG. 18 shows a perspective view of storage rack 100 resting on and supported by base 1600. Support lips 1615 and 1625 are configured to prevent large cross panel 215 and large flat panel 235 from splaying outwards (i.e. away from one another) under the weight of the objects and/or bottles being stored in storage rack 100. Support lips 1615 and 1625 prevent such splaying by engaging with and physically preventing edge 1805 of large cross panel 215 from move away from edge 1810 of large flat panel 235.

Figure 19:
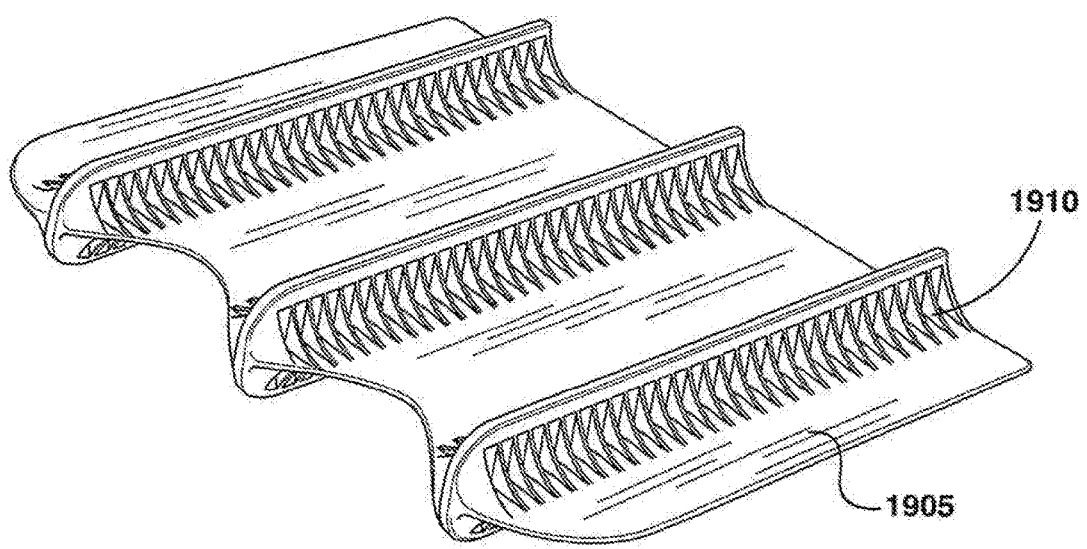
FIG. 19 shows a top perspective view of a cross panel, according to non-limiting implementations.
Figure 20:
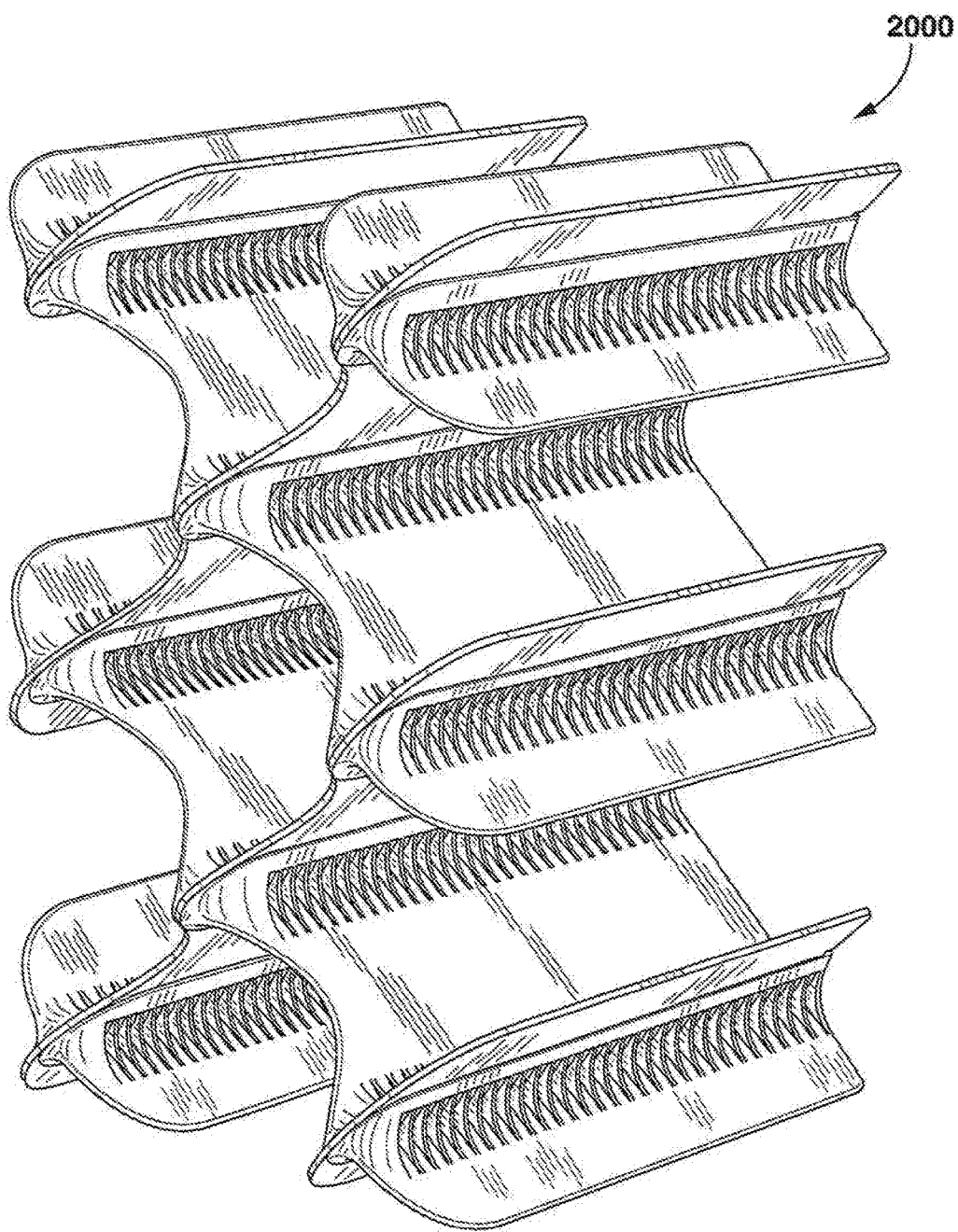
FIG. 20 shows a top perspective view of a modular storage rack, according to non-limiting implementations.

FIG. 19 shows a top perspective view of another implementation of a cross panel 1905 where the lips are supported by ribs 1910. Use of ribs 1910 reduces the amount and weight of material used to make the cross panels, while still providing support for the lips. FIG. 20 shows a top perspective view of a nine-bottle storage rack assembled using cross panels similar to cross panel 1905.

The above-described implementations are intended to be examples of the present invention and alterations and modifications may be effected thereto, by those of skill in the art, without departing from the scope of the invention which is defined solely by the claims appended hereto.

What is claimed is:

1. A modular storage rack comprising:
a first small flat panel and a second small flat panel, each comprising one flat segment;

a first large flat panel and a second large flat panel, each comprising three flat segments;
    each flat segment comprising a slit extending partway through the flat segment, the slit having a slit profile;
    the first large flat panel comprising a first outer flat segment, a second middle flat segment, and a third outer flat segment; and
    the second large flat panel comprising a fourth outer flat segment, a fifth middle flat segment, and a sixth outer flat segment;
a first small cross panel and a second small cross panel, each comprising one cross segment;
a first large cross panel and a second large cross panel, each comprising three cross segments;
    each cross segment comprising:
        a first planar portion terminating in a first lip oriented out of a first plane of the first planar portion;
        a second planar portion terminating in a second lip oriented out of a second plane of the second planar portion;
        the first lip facing the second lip, the first lip and the second lip defining a slot for receiving the flat segment; and
        an island joining the first planar portion to the second planar portion, the island disposed in the slot and between the first lip and the second lip, the island having an outer perimeter matching the slit profile, the island configured to be received in the slit;
    the first large cross panel comprising a first outer cross segment, a second middle cross segment, and a third outer cross segment; and
    the second large cross panel comprising a fourth outer cross segment, a fifth middle cross segment, and a sixth outer cross segment;
each given flat segment matingly connected to a corresponding cross segment such that the given flat segment is received in the slot of the corresponding cross segment and the island of the corresponding cross segment is received in the slit of the given flat segment, wherein:
    the first outer cross segment is matingly connected to the flat segment of the first small flat panel;
    the second middle cross segment is matingly connected to the second middle flat segment;
    the first outer flat segment is matingly connected to the cross segment of the first small cross panel;
    the third outer cross segment is matingly connected to the fourth outer flat segment;
    the third outer flat segment is matingly connected to the fourth outer cross segment;
    the fifth middle flat segment is matingly connected to the fifth middle cross segment;
    the sixth outer cross segment is matingly connected to the flat segment of the second small flat panel; and
    the sixth outer flat segment is matingly connected to the cross segment of the second small cross panel.

2. The modular storage rack of claim 1, wherein the modular storage rack is dimensioned to be useable as a wine rack.

3. The modular storage rack of claim 1, wherein the slit profile comprises a width of the slit being inconstant along a length of the slit.

4. The modular storage rack of claim 3, wherein the slit profile comprises a first region where the width of the slit decreases along the length of the slit, a second region where the width of the slit is constant along the length of the slit, and a third region where the width of the slit decreases along the length of the slit.

5. The modular storage rack of claim 1, further comprising a base for supporting the modular storage rack, the base comprising a planar base portion for resting on an external support, the planar base portion terminating in two support lips extending out of a corresponding plane of the planar based portion, each support lip extending from a corresponding edge of the planar base portion, the support lips opposite one another, the base configured to receive the modular storage rack of claim 1 on the planar base portion and between the support lips such that the support lips engage a corresponding edge of each of the first outer cross segment and the first outer flat segment to prevent the first outer cross segment splaying away from the first outer flat segment.

6. A modular storage rack comprising:
    two small flat panels each comprising one flat segment;
    two small cross panels each comprising one cross segment;
    one large flat panel comprising three flat segments; and
    one large cross panel comprising three cross segments;
    each flat segment comprising a slit extending partway through the flat segment, the slit having a slit profile;
    each cross segment comprising:
        a first planar portion terminating in a first lip oriented out of a first plane of the first planar portion;
        a second planar portion terminating in a second lip oriented out of a second plane of the second planar portion;
        the first lip facing the second lip, the first lip and the second lip defining a slot for receiving the flat segment; and
        an island joining the first planar portion to the second planar portion, the island disposed in the slot and between the first lip and the second lip, the island having
        an outer perimeter matching the slit profile, the island configured to be received in the slit; and
    each given flat segment matingly connected to a corresponding cross segment such that the given flat segment is received in the slot of the corresponding cross segment and the island of the corresponding cross segment is received in the slit of the given flat segment.

7. The modular storage rack of claim 6, wherein the slit profile comprises a width of the slit being inconstant along a length of the slit.

8. The modular storage rack of claim 7, wherein the slit profile comprises a first region where the width of the slit decreases along the length of the slit, a second region where the width of the slit is constant along the length of the slit, and a third region where the width of the slit decreases along the length of the slit.

9. The modular storage rack of claim 6, further comprising a base for supporting the modular storage rack, the base comprising a planar base portion for resting on an external support, the planar base portion terminating in two support lips extending out of a corresponding plane of the planar based portion, each support lip extending from a corresponding edge of the planar base portion, the support lips opposite one another, the base configured to receive the modular storage rack of claim 6 on the planar base portion and between the support lips such that the support lips engage a corresponding edge of at least one flat segment and one cross segment to prevent the one flat segment splaying away from the one cross segment.

10. A kit for assembling a modular storage rack, the kit comprising:

two small flat panels each comprising one flat segment;
two small cross panels each comprising one cross segment;
one large flat panel comprising three flat segments; and
one large cross panel comprising three cross segments;
each flat segment comprising a slit extending partway through the flat segment, the slit having a slit profile;
each cross segment comprising:
 a first planar portion terminating in a first lip oriented out of a first plane of the first planar portion;
 a second planar portion terminating in a second lip oriented out of a second plane of the second planar portion;
 the first lip facing the second lip, the first lip and the second lip defining a slot for receiving the flat segment; and
 an island joining the first planar portion to the second planar portion, the island disposed in the slot and between the first lip and the second lip, the island having an outer perimeter matching the slit profile, the island configured to be received in the slit; and
each given flat segment configured to matingly connect to a corresponding cross segment such that the given flat segment is received in the slot of the corresponding cross segment and the island of the corresponding cross segment is received in the slit of the given flat segment.

11. The kit of claim 10, further comprising
one additional large flat panel comprising three flat segments; and
one additional large cross panel comprising three cross segments.

12. The kit of claim 10, wherein the slit profile comprises a width of the slit being inconstant along a length of the slit.

13. The kit of claim 12, wherein the slit profile comprises a first region where the width of the slit decreases along the length of the slit, a second region where the width of the slit is constant along the length of the slit, and a third region where the width of the slit decreases along the length of the slit.

14. The kit of claim 10, further comprising a base for supporting the modular storage rack, the base comprising a planar base portion for resting on an external support, the planar base portion terminating in two support lips extending out of a corresponding plane of the planar based portion, each support lip extending from a corresponding edge of the planar base portion, the support lips opposite one another, the base configured to receive the modular storage rack on the planar base portion and between the support lips such that the support lips engage a corresponding edge of at least one flat segment and one cross segment to prevent the one flat segment splaying away from the one cross segment.

15. The kit of claim 10, further comprising one or more of:
 an extended flat panel comprising five flat segments; and
 an extended cross panel comprising five cross segments.

* * * * *